United States Patent [19]
Rudolph et al.

[11] 3,819,586
[45] June 25, 1974

[54] COATING MATERIAL BASED ON BLOCKED POLYURETHANES

[75] Inventors: Hans Rudolph; Rolf Dhein, both of Krefeld-Bockum; Eckhard De Cleur, Duisburg; Hans-Joachim Kreuder, Krefeld-Bockum, all of Germany

[73] Assignee: Bayer Aktiengesellschaft, Leverkusen, Germany

[22] Filed: June 2, 1972

[21] Appl. No.: 259,144

Related U.S. Application Data

[63] Continuation-in-part of Ser. No. 184,256, Sept. 27, 1971, abandoned.

[30] Foreign Application Priority Data

Sept. 29, 1970 Germany............................ 2047718

[52] U.S. Cl............ 260/77.5 TB, 117/17, 117/17.5, 260/18 TN, 260/22 TN, 260/75 NT, 260/77.5 CR
[51] Int. Cl.......................... C08g 22/32, B05b 5/00
[58] Field of Search ................ 260/75 NK, 77.5 TB; 117/17, 17.5

[56] References Cited
UNITED STATES PATENTS 2,698,845   1/1955   Mastin et al..................... 260/239.3
2,982,754   5/1961   Sheffer et al...................... 260/33.4
3,099,642   7/1963   Holtschmidt et al. ................ 260/75
3,245,961   4/1966   Fetscher et al..................... 260/77.5
3,384,506   5/1968   Elkin..................................... 117/62
3,439,649   4/1969   Probst et al.......................... 118/634
3,499,852   3/1970   Schroeder et al..................... 260/18
3,659,003   4/1972   Johnson et al...................... 260/859

OTHER PUBLICATIONS

Savage–Products Finishing, Jan. 1972, pages 40, 42 to 51.

Primary Examiner—H. S. Cockeram
Attorney, Agent, or Firm—Connolly and Hutz

[57] ABSTRACT

The invention relates to new varnish binders for coating materials and to a process of forming a continuous coating on an article by spraying a pulverulent coating material preferably having a softening point of 40°C, comprising those varnish binders of the present invention being pulverulent and having a softening point of at least 40°C, optionally in mixtures with additives, through an electric field on an article to adhere the said pulverulent coating material to said article and baking said coating material to fuse it into a continuous coating.

3 Claims, No Drawings

COATING MATERIAL BASED ON BLOCKED POLYURETHANES

In German Patent Specification No. 895,527 there is described a process for the production of binding agents which contain urethane and possibly contain carboxylic acid ester groups and also contain protected isocyanate groups, in addition to hydrogen atoms capable of reacting with isocyanate groups. For protecting the isocyanate groups, there are used alcohols, especially branched alcohols, phenols, malonic esters and acetoacetic esters. The products are particularly suitable as varnish binders and, insofar as they are used in this capacity, they are exclusively applied from solutions. When the varnish films prepared therefrom are heated, the agent protecting the isocyanate, i.e., for example, the alcohol, phenol etc., is eliminated to reform free isocyanate groups, and the isocyanate groups thus liberated subsequently react with the reactive hydrogen atoms, whereupon cross-linking and thus curing of the varnish film occurs.

It is known from DDR (German Democratic Republic) Patent Specification No. 55,820 to apply powdery mixtures of high-melting polyesters which contain hydroxyl groups, with polyisocyanates the isocyanate groups of which are protected with phenol, to substrates by a fluidization process, by electrostatic spraying or by spraying on, and subsequently to cure the aforesaid mixtures of polyesters by heating to form coatings. The disadvantages of this process consist in the very troublesome elimination of phenol, in the reactivity of the aforesaid mixtures which is frequently insufficient, even in the presence of catalyst, and, in particular, in the formation of bubbles and other disturbances of the flow, which may render the coatings useless.

The subject matter of the present invention comprises varnish binders comprising a polyol having at least one of its hydroxyl groups connected through a urethane linkage to an NCO-group of an organic polyisocyanate and having at least one of the NCO-groups of said organic polyisocyanate masked with ε-caprolactam, said polyol optionally being connected through further urethane linkages to unmasked organic polyisocyanates, and optionally in mixture with organic polyisocyanates being completely masked with ε-caprolactam. The varnish binders are cross-linked by heating at temperatures above about 140°C, preferably between 170°C and 210°C.

When used as raw materials for varnish, the new binders are superior to those mentioned above, in particular, on account of their better flow. This advantage is independent of whether the binders according to the invention are applied as liquid, solid or dissolved varnish raw materials, and it is of particular importance when the powdery binders according to the invention are applied, for example, according to the electrostatic powder spray process, since disturbances of flow are particularly frequent in this case, as is well known. A further advantage of using the powdery binders according to the invention rather than the phenol-masked isocyanates consists in that the noxious elimination of phenol during stoving can be dispensed with.

Suitable for the powder varnishing process are those binders according to the invention the softening temperatures of which lie between 40° and 140°C, preferably between 45° and 75°. These temperatures are determined according to the differential thermo-analysis method. (See: R. C. Mackenzie, Differential Thermal Analysis, London 1970, Vol. 1).

The new binders can be prepared by reacting polyols, which optionally contain carboxylic acid ester groups, for example, linear or branched polyesters, together with amounts of polyisocyanates up to the equivalent of the hydroxyl groups of the polyhydroxy compounds and with amounts of ε-caprolactam smaller than the equivalent of the isocyanate groups, expediently at temperatures of between 80° and 140°C. The obtained varnish binders have hydroxyl numbers between 5 and 150, preferably between 5 and 100.

However, it is more advantageous to prepare the new binding agents in two steps. Two possibilities are available for this purpose:

Polyols optionally containing carboxylic acid ester groups are reacted with a polyisocyanate partially protected with ε-caprolactam, optionally in the presence of unprotected polyisocyanate and optionally of polyisocyanate completely protected with ε-caprolactam, the amounts being so proportioned that the free isocyanate groups of the partially protected and of the unprotected polyisocyanates are at most equivalent to the free hydroxyl groups of the polyhydroxy compound.

The preparation of partially protected polyisocyanates by the reaction of polyisocyanates with less than equivalent amounts of ε-caprolactam results in mixtures of partially protected, unprotected and completely protected polyisocyanates. As a rule, it will not be necessary to isolate the partially protected polyisocyanates. The aforesaid mixtures as such are suitable for the reaction with the polyols. Polyisocyanates which are suitable for being masked with ε-caprolactam and/or for reacting with polyols, and the manufacture of masked polyisocyanates are for example described in "Houber-Weyl, Methoden der organischen Chemie," Band 14/2, Seiten 61–70. As specific examples of such polyisocyanates may be mentioned aliphatic polyisocyanates like hexamethylenediisocyanate, 1-isocyanato-3-(isocyanato-methyl)-3.5.5-trimethylcyclohexane, trimethylhexanediisocyanates, 4.4'-diisocyanato-dicyclohexylmethane, 2.4-and 2.6-hexahydrotoluylenediisocyanate and the reaction product of 3 moles hexamethylenediisocyanate and 1 mol $H_2O$ (biuret-triisocyanate); aromatic polyisocyanates like napthyldiisocyanates, 2.4-and 2.6-toluylenediisocyanate, 3.3'-dichlorodiphenyl-diisocyanates and the adduct of trimethylpropane and toluylenediisocyanate in a molar ratio of 1:3; araliphatic polyisocyanates like 4.4'-diisocyanato-diphenyl-methane, 4.4'.4''-triisocyanato-triphenylmethane.

Suitable temperatures for the reaction between the partially protected polyisocyanate and the polyols lie between 80° and 160°C.

The second possibility consists in that polyols optionally containing carboxylic acid ester groups are first reacted with amounts of polyisocyanates larger than the equivalent of the hydroxyl groups, and the free isocyanate groups of the reaction products are then reacted with equivalent amounts of ε-caprolactam, both reactions being performed at between 80°C and 140°C.

It is expedient for all three processes of production to proceed in such a way that the total number of ε-caprolactam protected isocyanate groups amounts from about 5 to about 90 % of all the isocyanate groups present in the initial polyisocyanate reactant, because mixtures of partially protected polyisocyanates, optionally in the presence of unprotected polyisocyanates and optionally in the presence of completely protected polyisocyanates are suitable for the reaction with the polyols.

Preferred polyisocyanates to be used are diisocyanates.

Polyols suitable for the production of the new binding agents are, for example, 1. polyhydroxyalkanes having a molecular weight of from 62 to about 240 like diols such as ethylene gylcol, 1.2-propane-diol, 1.3-butane-diol, 1.2-butane-diol, 1.4-butane-diol, 2.2-dimethylpropane-diol, hexane-diol-2.5, hexane-diol-1.6, 4'.4''-dihydroxy-dicyclohexyl-propane-2.2, cyclohexane-diol, diethylene glycol; polyhydric alcohols such as glycerol, hexane-triol, pentaerythritol, sorbitol, trimethylol-ethane and trimethylol-propane or "Kunstharz SK of Chemische Werke Huels, Germany";

2. polyester-polyols having a molecular weight of from about 204 to about 5000. The polyester-polyols may be produced in known manner by condensing at least one polycarboxylic acid recited hereinafter under (a) and/or (b) and at least one polyhydric aliphatic, araliphatic or cycloaliphatic alcohol recited under (c);

a. cyclic aromatic polycarboxylic acids, such as phthalic acid, isophthalic acid, terephthalic acid, benzene-1,2,4-tricarboxylic acid, 3,6-dichlorophthalic acid, and tetrachlorophthalic acid;

b. cycloaliphatic polycarboxylic acids, such as tetrahydrophthalic acid, hexahydrophthalic acid and endomethylenetetrahydrophthalic acid;

c. polyols, for example glycol, 1,2-propanediol, 1,3-butanediol, 1,2-butanediol, 1,4-butanediol, 2,2-dimethyl-propanediol, 2,5-hexanediol, 1,6-hexanediol, 4,4'-dihydroxydicyclohexylpropane-2,2, cyclohexanediols, diethylene glycol, bisoxethylated 4.4'-dihydroxy-diphenyl-2,2-propane, glycerine, hexanetriol, pentaerithritol, sorbitol, trimethylolethane and trimethylolpropane.

The cylcoaliphatic polycarboxylic acids are usable either alone or in admixture with the cyclic aromatic polycarboxylic acids. The polyester-polyols may also contain proportions of co-condensed monocarboxylic acids, e.g., benzoic acid, tert.-butyl-benzoic acid, hexahydrobenzoic acid; saturated and/or unsaturated fatty acids; as well as acyclic polycarboxylic acids, such as adipic acid and maleic acid. Examples are hydroxyl groups-containing alkyd resins obtained from the polyols, polycarboxylic acids and monocarboxylic acids such as saturated or unsaturated fatty acids or mixtures thereof, e.g. ethyl hexanoic acid, stearic acid, ricinic acid, coconut fatty acid, soya fatty acid, linseed fatty acid and ground nut fatty acid, and urethane alkyd resins, which are obtained when the polycarboxylic acids are partly or completely replaced by polyisocyanates.

3. polyether-polyols having a molecular weight of from about 150 to about 5000 like triethyleneglycol, 2,2-bis-[4-($\beta$-hydroxy-ethoxy)-phenyl]-propane, hydroxyl groups containing polyethers obtainable from the polyols listed above or so-called epoxide resins, such as, for example, obtainable from bisphenols and epichlorhydrin; suitable bisphenols are e.g. 2.2-(4.4'-dihydroxy-diphenyl)-propane, (4,4'-dihydroxy-diphenyl)-methane, 4,4'-dihydroxy-diphenyl-ether, 2.2-(3.5.3'.5'-tetrachloro-4,4'-dihydroxydiphenyl)-propane, 2.2-(3.5.3'.5'-tetrabromo-4.4'-dihydroxydiphenyl)-propane and 2.2-(3.5.3'.5'-tetramethyl-4.4'-dihydroxylidiphenyl)-propane.

4. polyhydroxy-polyacrylic resins having a molecular weight of from about 1000 to about 10000, obtainable by polymerisation of, for example, hydroxypropyl(meth)acrylic acid ester, hydroxyethyl(meth)acrylic acid ester, ethylacrylate, butylacrylate, 2-ethylhexylacrylate, methylmethacrylate, ethylmethacrylate, butylmethacrylate, laurylmethacrylate, styrene, $\alpha$-methylstyrene, vinyltoluene, acrylonitrile, acrylamide, vinylacetate, acrylic acid and methyarylic acid.

5. polyhydroxy-polyurethanes having a molecular weight of from about 292 to about 5000, obtainable by reaction of polyols listed above with polyisocyanates.

As specific examples of organic polyisocyanates which are suitable for preparing polyhydroxy-polyurethanes there may be mentioned:

5,1. aliphatic polyisocyanates like hexamethylenediisocyanate, 1-isocyanato-3-(isocyanato-methyl)-3.5.5-trimethylcyclohexane, trimethylhexane-diisocyanates, 4.4'-diisocyanato-dicyclohexyl-methane, 2.4-and 2.6-hexahydrotoluyenediisocyanate and the reaction product of 3 moles hexamethylenediisocyanate and 1 mol $H_2O$ (biuret-triisocyanate).

5,2. aromatic polyisocyanates like naphthyldiisocyanates, 2.4- and 2.6-toluylenediisocyanate, 3.3'-dichlorodiphenyl-diisocyanates and the adduct of trimethylolpropane and toluylene diisocyanate in a molar ratio of 1:3.

5,3. araliphatic polyisocyanates like 4.4'-diisocyanato-diphenyl-methane, 4,4'.4''-triisocyanato-triphenylmethane.

When used as coating materials, the new varnish binding agents or their solutions in the usual varnish solvents may be provided with the conventional additives, for example, dyestuffs, pigments, thickening agents, flow agents, e.g. cellulose acetobutyrates, plasticisers, fillers and catalysts, e.g. those mentioned in German Patent Specification No. 946,173. They may also be diluted with other varnish binders, especially with those containing hydrogen atoms capable of reacting with isocyanate groups, e.g. hydroxyl and amino groups.

The softening point of the varnish binders substantially depends on the type of polyol and polyisocyanate from which they are derived. For binding agents with softening temperatures of between 40° amd 140°C, which are preferred because they can be used as powder varnishes, glycol, hexane-1,6-diol, 4,4'-dihydroxy-dicyclohexyl-2,2-propane, 2,2-bis[4-($\beta$-hydroxyethoxy)-phenyl]-propane, glycerol, trimethylol-propane and pentaerythritol and the polyesters prepared from these compounds with the usual dicarboxylic acids are particularly suitable polyols; and hexamethylene-diisocyanate, toluylene-diisocyanate and 4,4'-diisocyanato-diphenyl-methane are particularly suitable diisocyanates.

These products can be worked up into powders, the flow properties of which are retained even during prolonged storage at temperatures of up to almost 40°C.

These powders can be applied to substrates in the usual way, especially as in coating materials, optionally in mixtures with additives, in the electrostatic powder spray process.

Another subject of the invention is therefore a process of forming a continuous coating on an article by spraying a pulverulent coating material, preferably having a softening point of 40°C, comprising those varnish binders of the present invention being pulverulent and having a softening point of at least 40°C, optionally in mixtures with additives, through an electric field on an article to adhere the said pulverulent coating material to said article and baking said coating material to fuse it into a continuous coating.

The varnish films are rapidly hardened by heating at temperatures of between 140°C and 220°C, preferably between 170°C and 210°C, to form smooth, especially crater-free and elastic, films of great hardness and high gloss. If the polyols on which they are based are free from ether groups, a further advantage, e.g. over the powder varnishes based on epoxide resins which have hitherto been most widely used, consists in a substantially increased gloss retention when the varnish coating is exposed to weathering.

EXAMPLE 1

In a stirrer vessel,
581 g isophthalic acid
1320 g perhydro-bisphenol A
603 g trimethylol-propane
130 g α-ethyl-hexanoic acid are heated in a nitrogen atmosphere to 140°C within one hour and to 200°C within a further 3 hours. This temperature is maintained until an acid number of 3.0 –4.5 is reached (total duration: 18 –20 hours), and the mixture is then cooled to 120°C.

In a further step, 1227 g (7.3 mol) hexamethylene-diisocyanate are heated in a three-neck flask of 2 litres capacity in a nitrogen atmopshere to 80°C. 429 g (3.8 mol) ε-caprolactam are added thereto with stirring in small portions within one hour, stirring is continued for 1 hour, and the mixture is then cooled to room temperature.

This reaction mixture of polyisocyanate and caprolactam-masked polyisocyanate is added dropwise in the course of 3 hours at 120° to 130°C to the precondensate prepared above, the mixture is subsequently heated to 140°C within 15 minutes, and the resin melt is drawn off.

| Characteristics | |
|---|---|
| OH number | 60 – 75 |
| free NCO (% by weight) | 0.2 – 0.7 |
| viscosity (50% in dimethyl formamide DIN 53211) | 70 – 80 sec |
| softening range (differential thermo-analysis method) | 50° – 52°C. |

PIGMENTED POWDER

A mixture of
100 parts by weight of resin
30 parts by weight of TiO₂ rutile
0.5 parts by weight of cellulose acetobutyrate and
2.0 parts by weight of endoethylene-piperazine is extruded according to usual processes, ground, sieved and subsequently applied electrostatically to Erichsen sheet metal.

After stoving (15 minutes at 210°C), there is obtained a white varnish coating forming a smooth homogeneous film which is stable to solvents, has a very good elasticity (8.4 mm according to Erichsen) at a layer thickness of 75–80 μ and very good adhesion.

EXAMPLE 2

16.37 Parts by weight terephthalic acid dimethyl ester, 24.4 parts by weight 2,2-bis[4-β-hydroxy-ethoxy)-phenyl]-propane and 1.27 parts by weight glycerol are condensed in the presence of 0.02 parts by weight titanium tetrabutylate at 220°C until the viscosity amounts to 50 seconds (40% in ethyl glycol acetate, DIN beaker 4). 100 Parts by weight of the polyester so obtained are mixed at 145°C with 18.3 parts by weight of a reaction product of equal parts by weight of ε-caprolactam and hexamethylene-diisocyanate. The same temperature is maintained for about 1 hour, and the mixture is then cooled to room temperature. The product obtained has a OH number of 30 and a softening point of 50°C (DTA).

100 Parts by weight of this product are intimately mixed in an edge-runner mixer with 20 parts by weight of a rutile titanium dioxide pigment and subsequently homogenised at 90° to 100°C in an extruder. After cooling, the strand is granulated and ground by means of a pinned mill to a granular size of below 100 μ. The granulate so prepared is applied to the substrate by means of an electrostatic powder spray device at 60 kv. Within 30 minutes at 200°C film-formation occurs to give coatings which are very hard at layer thicknesses of 90 to 100 μ. The coatings further exhibit an excellent adhesion and an elasticity of 10 mm in the Erichsen deep-drawing test.

EXAMPLE 3

104 g neopentyl glycol and 56.5 g ε-caprolactam are heated to 80°C. 168 g hexamethylene-diisocyanate are added dropwise with stirring within 1¼ hours. The strongly exothermic reaction is kept at 80° by cooling. Stirring is continued at this temperature for 2 hours and the mixture is then cooled to room temperature.

| Characteristics | |
|---|---|
| OH number | 80 – 85 |
| free NCO (% by weight) | 0.4 |
| viscosity (50% in dimethyl formamide DIN 53211) | 40 sec. |

Films of this resin applied from a 50% dimethyl formamide solution and stoved at 180°C for 30 minutes exhibit very good flow properties, a high elasticity and excellent adhesion.

EXAMPLE 4

218.2 g hexamethylene-diisocyanate are heated to 80°C. A mixture of 31 g ethylene glycol and 38 g propylene glycol is added dropwise with stirring in the course of 45 minutes, and this reaction mixture is reacted after a further 15 minutes with 67.8 g $\epsilon$-caprolactam. The mixture is heated at 130°C for 1 hour, the same temperature is maintained for a further 30 minutes, and the resin melt is drawn off.

| Characteristics | |
|---|---|
| OH number | 5 – 10 |
| free NCO (% by weight) | 0.2 – 0.4 |
| viscosity (20% in m-cresol, DIN 53211) | 45 sec |
| softening temperature (DTA) | 120°C |

When applied as a powder, this product likewise leads to coatings with excellent properties after a stoving time of 30 minutes at 180°C.

EXAMPLE 5

184.8 parts by weight hexamethylenediisocyanate and 33.9 parts by weight $\epsilon$-caprolactam are heated in 420 parts by weight of a mixture of solvents containing ethylacetate and ligroin (ratio: 3.5:1) to 70°C with stirring and maintained at this temperature for about one hour until the NCO-content is about 12.5 % by weight. After cooling to room temperature 94.4 parts by weight hexane-1.6-diol and 106 parts by weight of a ketone-aldehyde-condensation-resin having a softening range of 105° to 115°C, a hydroxylnumber of between 300 and 320 and an acid number of about 0.2 (Kunstharz SK of Chemische Werke Huls) are added; the mixture is then heated under reflux (at a temperature of about 78°C) and stirring for about 8 hours until the NCO-content is below 1 % by weight.

The reaction product is obtained as a powder which is sucked off after cooling, washed with the mixture of solvents and dried at 50°C in vacuum for 12 hours.

Instead of ligroin benzene or xylene, instead of ethylacetate acetone, methyl ethyl ketone or methylene chloride can be used as components of the solvent mixture.

Characteristics:
free NCO (% by weight) 0.1–0.4
viscosity (20 % in m-cresol, DIN 53 211): 70 sec
OH-number 77–79

When applied as a powder, this product likewise leads to high elastic coatings with excellent adhesion after a stoving time of 30 minutes at 200°C.

We claim:

1. A varnish binder having an hydroxyl number between 5 and 150 and consisting of a polyol having at least one of its hydroxyl groups connected through a urethane linkage to an NCO-group of an organic polyisocyanate and having at least one of the NCO-groups of said organic polyisocyanate masked with $\epsilon$-caprolactam, said polyol being at least one member of the group consisting of polyhydroxyalkane having a molecular weight from 62 to about 240, polyesterpolyol having a molecular weight from about 204 to about 5000, polyether-polyol having a molecular weight from about 150 to about 5000, polyhydroxy-polyacrylic resin having a molecular weight from about 1000 to about 10,000 and polyhydroxy-polyurethane having a molecular weight from about 292 to about 5000.

2. The varnish binder of claim 1 having a softening point of at least 40°C.

3. Pulverulent coating materials containing a varnish binder of claim 2.

* * * * *